United States Patent [19]

Bose et al.

[11] Patent Number: 5,026,402
[45] Date of Patent: Jun. 25, 1991

[54] METHOD OF MAKING A FINAL CELL ELECTRODE ASSEMBLY SUBSTRATE

[75] Inventors: Sudhangshu Bose; Michael E. Gorman, both of Manchester, Conn.

[73] Assignee: International Fuel Cells Corporation, South Windsor, Conn.

[21] Appl. No.: 602,111

[22] Filed: Oct. 22, 1990

Related U.S. Application Data

[62] Division of Ser. No. 432,335, Nov. 3, 1989, Pat. No. 4,985,316.

[51] Int. Cl.$^5$ .............................................. H01M 6/00
[52] U.S. Cl. .................................. 29/623.5; 427/115; 29/623.1
[58] Field of Search ......................... 429/44, 252, 209; 29/623.5; 427/115, 228, 122; 264/29.1

[56] References Cited

U.S. PATENT DOCUMENTS 3,912,538 10/1975 Dews et al. .
4,360,417 11/1982 Reger et al. .
4,377,033 3/1983 Barnes et al. ...................... 29/623.5
4,435,252 3/1984 Kadija .
4,472,460 9/1984 Kampe et al. .
4,497,882 2/1985 Mikkor .............................. 29/623.5
4,611,396 9/1986 Joo et al. ...................... 29/623.1 X
4,759,989 4/1988 Abe et al. .
4,782,586 11/1988 Joo et al. ........................ 427/115 X Primary Examiner—Anthony Skapars
Attorney, Agent, or Firm—William J. Sapone

[57] ABSTRACT

A porous substrate of a fuel cell electrode assembly is formed by producing a fibrous carbon precursor web by means of a conventional wet paper-making process. The precursor web is then dried and saturated with a wet resinous binder which will carbonize when heated. Substantially the entirety of all of the carbon fibers in the web are thus coated with the binder, and substantially all of the inter-fiber junctures in the web will also be coated with the binder. The saturated web is then dried, and heat treated to convert the binder to a glassy carbon which exhibits superior resistance to corrosion.

5 Claims, No Drawings

METHOD OF MAKING A FINAL CELL ELECTRODE ASSEMBLY SUBSTRATE

This is a division of application Ser. No. 432,335, filed Nov. 3, 1989, now U.S. Pat. No. 4,985,316.

TECHNICAL FIELD

This invention relates to a fuel cell electrode assembly substrate which exhibits improved corrosion resistance, and to a method of making the substrate.

BACKGROUND ART

Phosphoric acid fuel cells may employ an electrode structure which includes a substrate component onto a surface of which there is deposited a catalyst layer. The substrate will typically be formed first, and the catalyst layer deposited in a subsequent step. The substrate is formed from a fibrous carbon material, or from a mixture of carbon fibers and carbon powder. The substrate is currently formed by using a dry process. In the dry process, a mixture of carbon fibers, with or without a carbon powder additive, and a particulate binder is formed. The binder should be a resin which is activated by heat, and can be carbonized by subsequent heating steps. Phenolic resins have proven suitable for such applications. The carbon and resin components are intimately mixed together and deposited on a moving support screen, or the like, as a continuous web. The web is then compacted and heated to set the binder whereby a coherent substrate is formed. Subsequent heating steps are performed to carbonize the binder, which is converted by heat to a glassy form of carbon, and produces the final substrate material. The substrate layer may then be grooved by machining or the like to form reactant flow fields, and may have the catalytic layer deposited thereon. Substrate structures made by the aforesaid dry method exhibit certain undesirable characteristics, in that they are relatively fragile, and are not as highly corrosion resistant as would be preferred for a component used in the highly corrosive environment of a phosphoric acid fuel cell. The reasons for the fragility and lack of corrosion resistance are both that the carbon fibers are not completely covered by the binder after it is heat set. When the two components are mixed dry, it has been determined that the binder particles are never perfectly evenly distributed in the mixture, so that portions of the carbon fibers will not be coated by the binder or the resultant glassy carbon which results when the binder is carbonized. Likewise, not all of the junctures between the matted fibers will be covered by the binder, resulting in an inherently weaker and more fragile article.

DISCLOSURE OF THE INVENTION

This invention relates to a method for making a stronger and more corrosion resistant substrate, and to the substrate resulting from that method. The method of this invention includes the preliminary step of forming a precursor web of matted carbon fibers by means of a relatively conventional paper making machine, and then drying the resulting web. The dry web is then saturated with the binder resin in a wet form. This results in all of the fibers in the web being completely covered by the binder resin, and all of the fiber junctures in the web being covered by the binder resin. The saturated web is then dried to drain off the liquid constituent in the binder, and the binder is then heat set at a suitable temperature. Thereafter, the web is heated so as to carbonize all of the binder in the web. When heated to graphitizing temperatures the binder is converted into a glassy, amorphous form of carbon which is highly resistant to corrosion, more so than the carbon fibers. Since all of the fibers are substantially completely covered by the glassy carbon, the entire substrate is rendered more resistant to corrosion.

It is therefore an object of this invention to provide a fuel cell electrode substrate structure for use in an acid fuel cell assembly which substrate has improved strength and improved resistance to corrosion.

It is an additional object of this invention to provide a fuel cell electrode substrate of the character described in which substantially all exposed and interstitial surfaces are formed from a highly corrosion resistant form of carbon.

It is a further object of this invention to provide a fuel cell electrode substrate of the character described where the corrosion resistant carbon is formed from a graphitized heat setting resinous binder impregnated into the substrate.

It is another object of this invention to provide a fuel cell electrode substrate of the character described wherein a carbon fiber component is formed into a mat, which mat is saturated with a liquid resinous binder to ensure that all fiber interfaces are covered with the binder.

These and other objects and advantages will become more readily apparent from the following detailed description of a preferred embodiment of the invention.

BEST MODE FOR CARRYING ON THE INVENTION

Example 1

A fuel cell electrode substrate was made by dry blending a mixture of 40% by weight powdered phenolic binder and 60% by weight of a carbonized natural fiber for about 10 minutes. The blended mixture was then showered in the air into a porous polytetrafluoroethylene coated fiberglass cloth with a vacuum drawn through the cloth. The mixture was deposited until a loading of approximately 225 g/m$^2$ was achieved. The deposited web was then pressed to a thickness of about 25 mils at a temperature of 325.F for three minutes to thermoset the phenolic binder. The resulting composite was then heat treated in a nitrogen atmosphere to a final temperature of 1850° F., at a rate of temperature increase of 8° F. per hour to convert the phenolic binder to carbon. The carbonized body was then heat treated in a graphitizing furnace to a final temperature of 2850.C to graphitize the carbon fibers.

The resultant substrate was used as an example of a prior art substrate for comparing characteristics with substrates made in accordance with this invention.

Example 2

A second fuel cell electrode substrate was made by forming a carbon fiber web from a carbonized natural fiber, using a conventional web paper-making process, with a polyvinyl alcohol binder fiber incorporated into the slurry. The web thus formed was dried and then saturated with a 10-15% by weight phenolic resin dispersed in a water carrier so as to add to the fiber web 50% by weight of the phenolic resin. The saturated web was then air dried for ten minutes at a temperature of 230° F. The dried composite was then pressed, thermoset, and heat treated in the same manner as set forth in Example 1.

Example 3

A third fuel cell electrode substrate was made by preparing a carbon fiber web as in Example 2. A 50% by weight phenolic binder dissolved in an organic solvent was impregnated into the web so as to saturate the latter with the dissolved binder. The saturated web was then dried, pressed, thermoset, and heat treated as in Example 2.

The physical characteristics of the three sample substrates are put forth in Table 1.

TABLE 1

| Subtrate | Density (g/cc) | Corrosion Potential (mv) | Corrosion Current (ma/mg) | Corrosion Current (ma/cm$^2$) |
|---|---|---|---|---|
| Example 1 | 0.35 | 1150 | 3.65 | 23.66 |
| Example 2 | 0.39 | 1190 | 0.29 | 2.98 |
| Example 3 | 0.30 | 1225 | 0.09 | 0.60 |

From the data set forth in Table 1, it is clear that the substrates of Examples 2 and 3, formed in accordance with this invention are significantly more corrosion resistant then the substrate formed in accordance with the prior art dry forming process.

In particular, the substrate saturated with the dissolved binder exhibits the best corrosion resistance characteristics. Scanning electron micrographs show that a consistent, uniform coating of the phenolic binder is obtained over the carbon fibers using the procedure of this invention. Substantially all of the inter-fiber junctures in the web are coated with the binder using the procedure of this invention. Preferred solvents for the phenolic binder are acetone, and low molecular weight alcohols.

In order to measure the electrical characteristics of a cell using substrates formed in accordance with this invention, a cell assembly was made as follows. Substrates for the 2 inch by 2 inch fuel cell performance test cell were prepared by carbonizing treated cotton fibers and forming these carbon fibers into a web via a wet papermaking process. The web was made to a basis weight of about 150 gm/m$^2$. The resulting carbon fiber web was then saturated with a 12% by weight solution of phenolic resin dispersed in water to obtain a finished substrate having a 50% by weight resin content. The saturated paper was then dried at 230° F. for 5–10 minutes to evaporate the water from the web, and leave the phenolic resin in place in the web. The dried sheet was then pressed to a constant thickness of 25 mils at 325° F. for 3 minutes to thermoset the phenolic resin. The sheet was then heat treated as described in the aforesaid Example 1. The heat treated sheet was then catalyzed to serve as electrodes in a 2 inch by 2 inch fuel cell. The anode of the cell contained ¼ mg of platinum /cm$^2$, a 10% by weight platinum—Vulcan catalyst, a 50% by weight PTFE content, and a 1 mil thick silicon carbide matrix.

The cathode of the cell contained ½ mg of platinum /cm$^2$ a GSB-18 catalyst, a PTFE content of 35% by weight, and a 1 mil thick silicon carbide matrix.

These cathode and anode plates were then paired with electrolyte reservoir plates, the cathode reservoir plate being a ribbed carbon-carbon plate with a mean pore size of 9 microns, and the anode reservoir plates being a ribbed carbon-carbon plate with a mean pore size of 21 microns. Performance of the resultant cell was 685 MV at 200 ASF at 370 hrs using 70% $H_2$/29% $CO_2$/1% CO as the anode reactant, and air as the cathode reactant.

Table 2 is a comparison of the performance of the aforesaid cell with a typical cell whose substrates were formed with the prior art air layering technique.

TABLE 2

| Cell | Performance (MV/200 ASF) | Cell IR (MV) | $O_2$ (MV) | Air Limiting Current (ASF) |
|---|---|---|---|---|
| Resin | | | | |
| Impregnated | 685 | 16 | 78 | 2006 |
| Air Layered | 676 | 14 | 78 | 1754 |

From Table 1 and Table 2 it is readily apparent that the cell having the resin impregnated substrates in terms of performance is the equal of the prior art cell, and in terms of corrosion resistance, it is vastly superior. In addition to the improved resistance to corrosion, the substrate plates of this invention are stronger than the prior art plates.

It will be readily appreciated that the wet process of this invention could be used in a continuous production line mode to form substrates from a roll of the precursor carbon fiber paper. The paper from the roll could be fed through a bath of the wet binder, then to an evaporation station, and then into a belt press compaction and thermosetter. The sheet would then be cut into the desired plate sizes and heat treated to form the final product.

Since many changes and variations of the disclosed embodiments of the invention may be made without departing from the invention concept, it is not intended to limit the invention otherwise than as required by the appended claims.

What is claimed is:

1. A method for forming a fuel cell electrode assembly substrate comprising the steps of:
   a) forming a precursor carbon fiber mat using a wet paper making procedure;
   b) drying said precursor mat to remove entrained liquid therefrom;
   c) saturating the dried precursor mat with a carbonizable liquid binder so that substantially all interstitial spaces in the precursor mat will be filled with the liquid binder;
   d) removing the liquid portion of the binder from the saturated precursor mat; and
   e) subjecting the mat to graphitizing temperatures to convert the binder to a glassy form of carbon which coats substantially all the carbon fibers and substantially all of the interfiber junctures in the mat.

2. The method of claim 1 comprising the step of using a polyvinyl alcohol binder in forming said precursor carbon fiber mat.

3. The method of claim 2 wherein said carbonizable liquid binder is a phenolic resin.

4. The method of claim 3 wherein said phenolic resin is carried in an aqueous mixture during the saturating step.

5. The method of claim 3 wherein said phenolic resin is dissolved in an organic solvent during the saturating step.

* * * * *